(12) United States Patent
Gordani et al.

(10) Patent No.: US 11,030,034 B2
(45) Date of Patent: Jun. 8, 2021

(54) QUANTITATIVE SOFTWARE FAILURE MODE AND EFFECTS ANALYSIS

(71) Applicant: Intel Corporation, Santa Clara, CA (US)

(72) Inventors: Rigels Gordani, San Giuliano Terme (IT); Luca Fogli, San Giuliano Terme (IT); Francesco Pingitore, Pisa (IT); Giovanni Satori, San Giuliano Terme (IT)

(73) Assignee: Intel Corporation, Santa Clara, CA (US)

( * ) Notice: Subject to any disclaimer, the term of this patent is extended or adjusted under 35 U.S.C. 154(b) by 138 days.

(21) Appl. No.: 16/267,612

(22) Filed: Feb. 5, 2019

(65) Prior Publication Data

US 2019/0235943 A1 Aug. 1, 2019

(51) Int. Cl.
*G06F 11/07* (2006.01)

(52) U.S. Cl.
CPC ........ *G06F 11/079* (2013.01); *G06F 11/0751* (2013.01); *G06F 11/0754* (2013.01); *G06F 11/0769* (2013.01); *G06F 11/0793* (2013.01)

(58) Field of Classification Search
CPC .............. G06F 11/008; G06F 11/0754; G06F 11/0769; G06F 11/079; G06F 11/0793; G06Q 10/0635
See application file for complete search history.

(56) References Cited

U.S. PATENT DOCUMENTS

| | | | | |
|---|---|---|---|---|
| 7,412,632 B2* | 8/2008 | Liddy | .................... | G06Q 10/10 714/57 |
| 8,180,466 B2* | 5/2012 | Longsdorf | ............... | G05B 9/02 700/79 |

OTHER PUBLICATIONS

Bonfiglio V, Montecchi L, Irrera I, Rossi F, Lollini P, Bondavalli A; "Software Faults Emulation at Model-Level: Towards Automated Software FMEA;" IEEE International Conference on Dependable Systems and Networks Workshops; Jun. 22, 2015; pp. 133-140.*

(Continued)

*Primary Examiner* — Joseph R Kudirka
(74) *Attorney, Agent, or Firm* — Schwegman Lundberg & Woessner, P.A.

(57) ABSTRACT

Systems and methods may be used to perform a software failure mode and effects analysis (SW FMEA) for a software component. The SW FMEA may include a quantitative approach, for example based on a risk priority number for the software component. The risk priority number may be based on a severity of a failure in the software component, an occurrence likelihood of a failure in the software component, or a detectability of a failure in the software component. A safety integrity level may be determined for the software component based on the risk priority number.

24 Claims, 10 Drawing Sheets

*— 200*

| | RPN THRESHLD | | | |
|---|---|---|---|---|
| MATURITY | SIL 1 | SIL 2 | | SIL 3 |
| | ASIL A | ASIL B | ASIL C | ASIL D |
| NEW/IMMATURE SW | 200 / 150 | 150 / 100 | 100 / 80 | 80 / 60 |
| MATURE SW | 200 / 150 | 200 / 150 | 150 / 100 | 100 / 80 |

(56) References Cited

OTHER PUBLICATIONS

Zhang H, Li W, Qin J; "Model-based Functional Safety Analysis Method for Automotive Embedded System Application;" 2010 International Conference on Intelligent Control and Information Processing; Aug. 13, 2010; pp. 761-765; IEEE.*

Leu KL, Huang H, Chen YY, Huang LR, Ji KM; "An Intelligent Brake-By-Wire System Design and Analysis in Accordance with ISO-26262 Functional Safety Standard;" 2015 International Conference on Connected Vehicles and Expo (ICCVE); Oct. 19, 2015; pp. 150-156; IEEE.*

Burton S, Likkei J, Vembar P, Wolf M; "Automotive Functional Safety = Safety + Security;" Proceedings of the First International Conference on Security of Internet of Things; Aug. 17, 2012; pp. 150-159.*

* cited by examiner

| MATURITY | RPN THRESHLD | | | |
|---|---|---|---|---|
| | SIL 1 | SIL 2 | | SIL 3 |
| | ASIL A | ASIL B | ASIL C | ASIL D |
| NEW/IMMATURE SW | 200 / 150 | 150 / 100 | 100 / 80 | 80 / 60 |
| MATURE SW | 200 / 150 | 200 / 150 | 150 / 100 | 100 / 80 |

| DESCRIPTION | DEFINITION | VALUE |
|---|---|---|
| VERY FREQUENT | PERIODIC TASK/OPERATION (LIKELY TO OCCUR FREQUENTLY) (FORTIFIED) | 10 |
| FREQUENT | LIKELY TO OCCUR FREQUENTLY | 9 |
| VERY PROBABLE | WILL OCCUR SEVERAL TIMES IN THE USAGE OF THE SW (FORTIFIED) | 8 |
| PROBABLE | WILL OCCUR SEVERAL TIMES IN THE USAGE OF THE SW | 7 |
| MODERATE OCC | LIKELY TO OCCUR SOMETIME IN THE USAGE OF THE SW (FORTIFIED) | 6 |
| OCCASIONAL | DEPENDS ON CONTROL FLOW AND EXTERNAL EVENTS (LIKELY TO OCCUR SOMETIME IN THE USAGE OF THE SW) | 5 |
| REMOTE | UNLIKELY BUT POSSIBLE TO OCCUR IN THE USAGE OF THE SW (FORTIFIED) | 4 |
| VERY REMOTE | UNLIKELY BUT POSSIBLE TO OCCUR IN THE USAGE OF THE SW | 3 |
| IMPROBABLE | SO UNLIKELY IT MAY BE ASSUMED OCCURRENCE MAY NOT BE EXPERIENCED (FORTIFIED) | 2 |
| VERY IMPROBABLE | RUNS ONLY ON STARTUP/BOOT (SO UNLIKELY IT MAY BE ASSUMED OCCURRENCE MAY NOT BE EXPERIENCED) | 1 |

402

| TASK EXECUTED \ SW | LEGACY CODE | QM | ASIL A, ASIL B, SIL 1, SIL 2 | ASIL C, ASIL D, SIL 3 |
|---|---|---|---|---|
| PERIODIC SW | 8 | 6 | 3 | 2 |
| NOT PERIODIC SW | 4 | 3 | 2 | 1 |

| SAFETY MECHANISM | DETECTABILITY |
|---|---|
| RANGE CHECK | 3 |
| PLAUSIBILITY CHECK | |
| DETECTION OF DATA ERRORS | |
| ACCESS VIOLATION CONTROL MECHANISMS | |
| DETECTION OF DATA ERRORS | 2 |
| DIVERSE REDUNDANCY | |
| TEMPORAL MONITORING OF PROGRAM EXECUTION | 1 |
| DIVERSE REDUNDANCY | |

QUANTITATIVE SOFTWARE FAILURE MODE AND EFFECTS ANALYSIS

BACKGROUND

Failure Modes and Effects Analysis (FMEA) is a technique used to improve processes, manufacturing, and functioning of systems, to identify failures based on impact. A failure may occur at a particular part or structure, at a linking or coupling of parts or structures, or on a system as a whole. Software (SW) FMEA may be used to evaluate software systems or programs for failures similar to hardware FMEA analyses. Current techniques for SW FMEA are limited to subjective and qualitative approaches, relying on the instinct and experience of an engineer evaluating the system.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2 illustrates a chart showing example safety integrity level and risk priority number thresholds in accordance with some embodiments.

FIG. 4 illustrates a quantitative occurrence table in accordance with some embodiments.

FIG. 5 illustrates a quantitative detectability table in accordance with some embodiments.

DETAILED DESCRIPTION

Systems and methods for performing a software failure mode and effects analysis (SW FMEA) are described herein. The systems and methods described herein use an objective, quantitative approach to the SW FMEA problem to improve software systems by removing or reducing potential failures. The quantitative approach to SW FMEA described herein may be used with complex safety critical software environments to identify failures. The systems and methods described herein provide an objective approach by, for example, ranking failure possibilities, thus removing previously required subjective analysis of a system.

The systems and methods described herein use quantitative evaluation to perform a safety analysis task. The quantitative approach described herein includes determining a risk priority number (RPN). The RPN may be based on a severity, an occurrence, and a detectability as objective indicators of a failure's effects to be analyzed for different software, firmware, or other program component or subcomponent. In an example, the quantitative approach may be used to analyze every possible software failure mode in a system. Any identified failures may be addressed, making the system more robust.

SW FMEA may be performed on any software component or subcomponent, or on interactions between components or subcomponents. SW FMEA is used to identify potential or likely problems during testing or development (or as ongoing improvement after deployment). Once identified, a failure may be addressed by improving code in a component or subcomponent, changing interactions among or between components or subcomponents, swapping components or subcomponents, rewriting components or subcomponents, or the like. After a failure is addressed, the objective SW FMEA may be reperformed to determine an updated RPN (often improved, unless changes that were made then result in a new failure that is identified). The objective SW FMEA may be an iterative process. The systems and methods described herein may output results of the objective SW FMEA, output failures, output recommended actions to remedy potential failures, or the like. These outputs may be displayed on a user interface. In an example, a failure may be automatically remedied, such as by adjusting detectability (e.g., adding a sensor output, a feedback loop, a monitor component, etc.).

Figure 1:
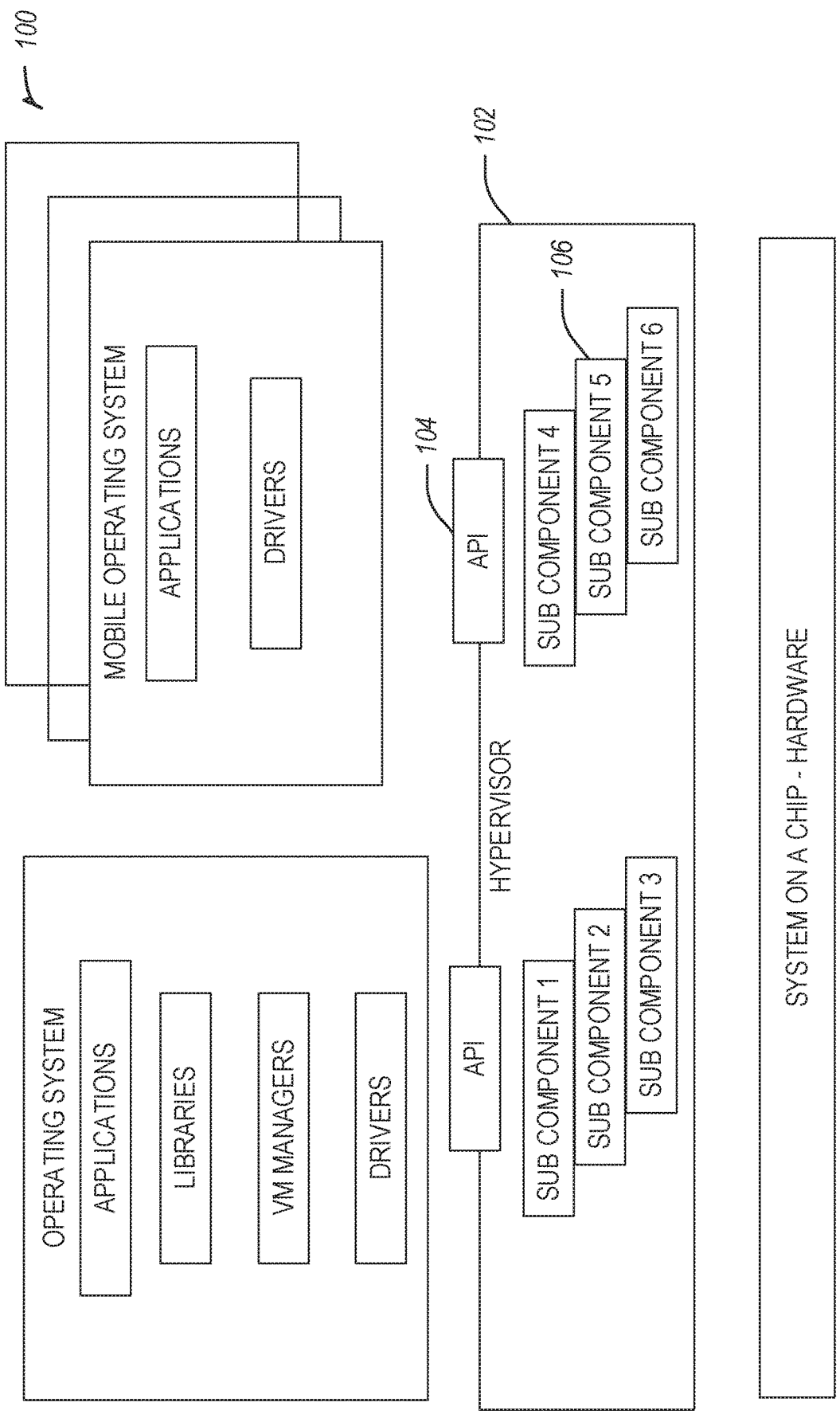
FIG. 1 illustrates an example of high-level software architecture in accordance with some embodiments.

FIG. 1 illustrates an example of high-level software architecture 100 in accordance with some embodiments. The software architecture 100 includes a plurality of components and subcomponents, any or all of which may be tested using an objective SW FMEA to determine a RPN.

The objective SW FMEA may be used to capture possible failures modes, initially at system level of the software architecture 100, and then in an example, at the component level (e.g., component 102). The objective SW FMEA may be conducted on external interfaces of a component (e.g., interface 104) by following a respective architectural breakdown. In an example, a subcomponent (e.g., subcomponent 106) may be evaluated separately to obtain its own RPN (e.g., subcomponent 106 of component 102).

Based on an initial RPN of the failure mode, measures may be generated to reduce the initial RPN. These measures may include control, detection, or prevention measures, which may be displayed on a user interface. The measures may be evaluated in terms of effectiveness using a mitigated RPN generated after the measures are taken. This process may be repeated until a specified RPN is determined (e.g., an RPN below a threshold for the interface, component, subcomponent, or system). In an example, an average, median, combined total, or other combination of RPNs may be used to evaluate a system, for example a combination of subcomponents to evaluate a component or a combination of components to evaluate a system, or the like.

In an example, the measures described above may include an additional SW safety requirement describing an applicable safety mechanism to alleviate the failure. After the corrections are implemented and the safety requirement is verified, the specific SW FMEA item (related to the failure mode) may be closed. In an example, the SW FMEA items may be ordered based on a specific field, for example the mitigated RPN or the initial RPN.

The RPN may be used in conjunction with safety levels, as described in more detail below. For example, a safety integrity level (SIL) according to an International Electrotechnical Commission (IEC) 61508 standard or an automotive safety integrity level (ASIL) according to an International Organization for Standardization (ISO) 26262 standard may be used to determine the RPN.

One example output may include a determination of an ASIL/SIL for the component, subcomponent or interface. The determined ASIL/SIL may be compared to a defined level, for example in a Software Safety Requirement document. When the determined level is insufficient when compared to the defined level, changes may be implemented or suggested to lower the RPN, thus changing the determined level, for example a processor may suggest a control measure, a detection measure, or a prevention measure.

In an example, an objective SW FMEA may be implemented to output an RPN for the software architecture 100 using details about the software architecture 100 as inputs. For example, detailed software architecture 100 information may be used, such as sequence diagrams, timing diagrams, component diagram, or the like. Other data may be used, such as a detailed description of the sub-component, information about interfaces between subcomponents, details about an external interface of the component, or the like.

FIG. 2 illustrates a chart 200 showing example safety integrity level and risk priority number thresholds in accordance with some embodiments. The chart 200 shows various levels, such as SIL 1, 2, and 3, and ASIL A, B, C, and D with different threshold values representing actions to be taken for given RPN values. For example, for a component at a level of SIL 1/ASIL A, when an initial RPN is between 150 and 200, a countermeasure may be recommended (to lower the initial RPN). At that same level, when the initial RPN is above 200, a countermeasure may be required, in an example. The values shown in the chart 200 are exemplary, and other values, thresholds, ranges, or buckets may be used, including a single value, more than two values, different attributes for different levels, etc. Additionally, shown in the chart 200 are optional distinct value ranges for new or immature software (e.g., beta or initial release) versus mature software (e.g., a stable release).

In an example, countermeasures may affect occurrence or detectability of the RPN, but not the severity. The RPN may be determined based on a combination (e.g., linear combination, weighted or unweighted, missing one element, including additional elements, etc.) of severity, occurrence, and detectability. For example, the RPN may be determined by multiplying severity times occurrence times detectability of a component.

Figure 3:
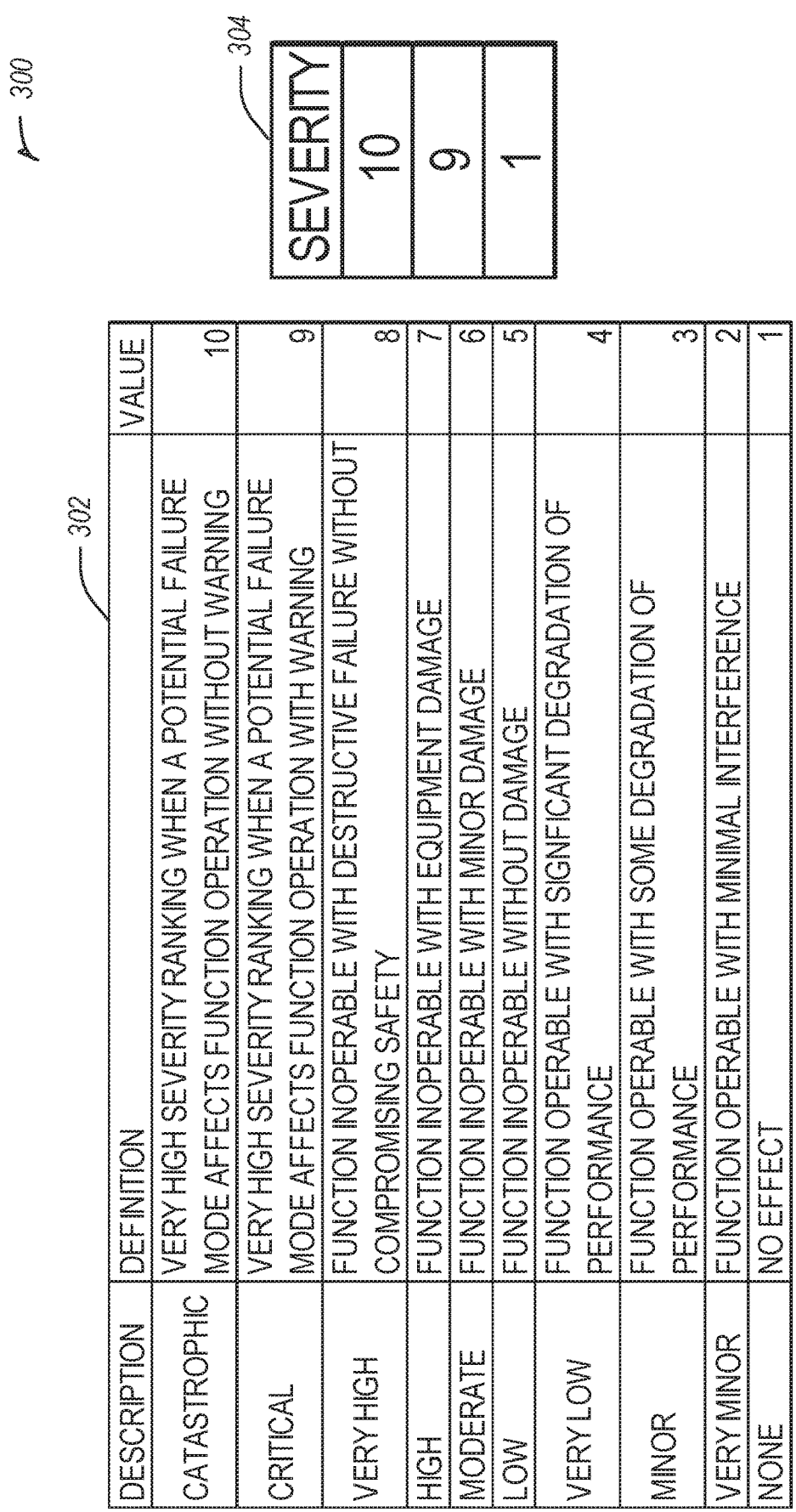
FIG. 3 illustrates a quantitative severity table in accordance with some embodiments.

FIG. 3 illustrates a quantitative severity table 300 in accordance with some embodiments. The quantitative severity table 300 includes a description portion 302 and a severity value portion 304. The description portion 302 identifies various levels of severity of a failure. The levels provide information about the effect to an overall software architecture system of a failure of a currently tested component or an effect on a component of a failure of a subcomponent. After the applicable description is identified, a value is given to the severity of failure of the component. The severity value portion shows three example values for a failure for a particular component.

FIG. 4 illustrates a quantitative occurrence table 400 in accordance with some embodiments. Similar to the quantitative severity table 300 discussed above, the quantitative occurrence table 400 includes a description portion 402 and an occurrence value portion 404. The description portion 402 includes various occurrence likelihood descriptions that are assigned particular values. The occurrence value portion 404 shows occurrence values for a component in various scenarios, including whether the software is periodic or not periodic (e.g., asynchronous interrupt), and whether any mitigation is already implanted, such as quality management (QM) or SIL/ASIL levels.

FIG. 5 illustrates a quantitative detectability table 500 in accordance with some embodiments. The quantitative detectability table 500 includes a description portion 502 and a detectability value portion 504. Detectability may include safety monitoring or controls, and detectability is based on likelihood of detection of a failure. Examples of safety mechanisms are shown below in Tables 1 and 2:

TABLE 1

Example Safety Mechanisms for Error Detection:

Range checks of input or output data.
Plausibility check (e.g., using a reference model of the desired behavior, assertion checks, or comparing signals from different sources.
Detection of data errors (e.g., error detecting codes and multiple data storage).
Monitoring of program execution by an external element such as an ASIC or another software element performing a watchdog function. Monitoring may be logical or temporal or both.
Temporal monitoring of program execution.
Diverse redundancy in the design.
Access violation control mechanisms implemented in software or hardware concerned with granting of denying access to safety-related shared resources.

TABLE 2

Example Safety Mechanisms for Error Handling:

Deactivation to achieve and maintain a safe state.
Static recovery mechanism (e.g., recovery blocks, backward recovery, forward recovery, or recovery through repetition).
Graceful degradation by prioritizing functions to minimize adverse effects of potential failure on functional safety.
Homogenous redundancy in design, for example focusing primarily to control effects of transient faults or random faults in the hardware on which a similar software is executed (e.g., temporal redundant execution of software).
Diverse redundancy in the design, which may be implemented using dissimilar software in each or some parallel path, for example focusing on the prevention or control of systematic faults in the software.
Correcting codes for data.
Access permission management implemented in software or hardware concerned with granting or denying access to safety-related shared resources.

Figure 6:
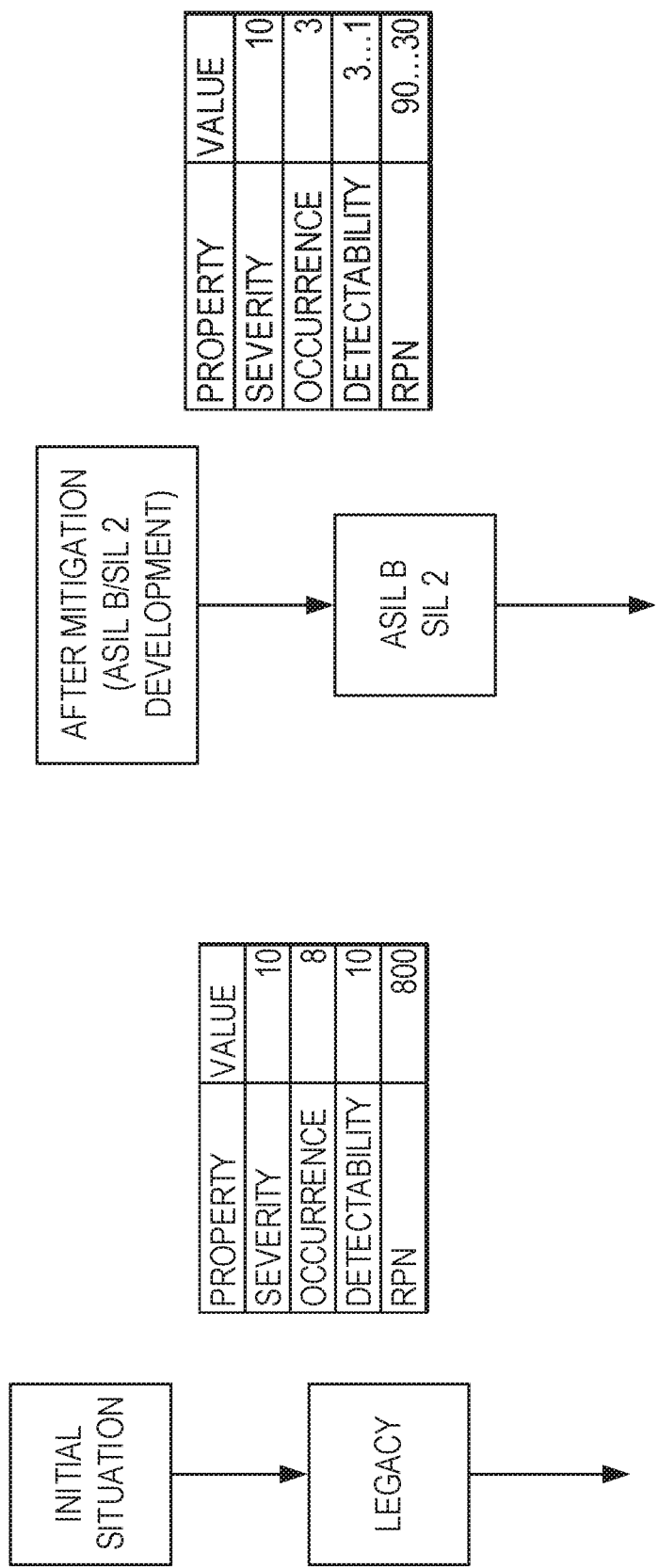
FIGS. 6-7 illustrate example initial and mitigated SW FMEA in accordance with some embodiments.
Figure 7:
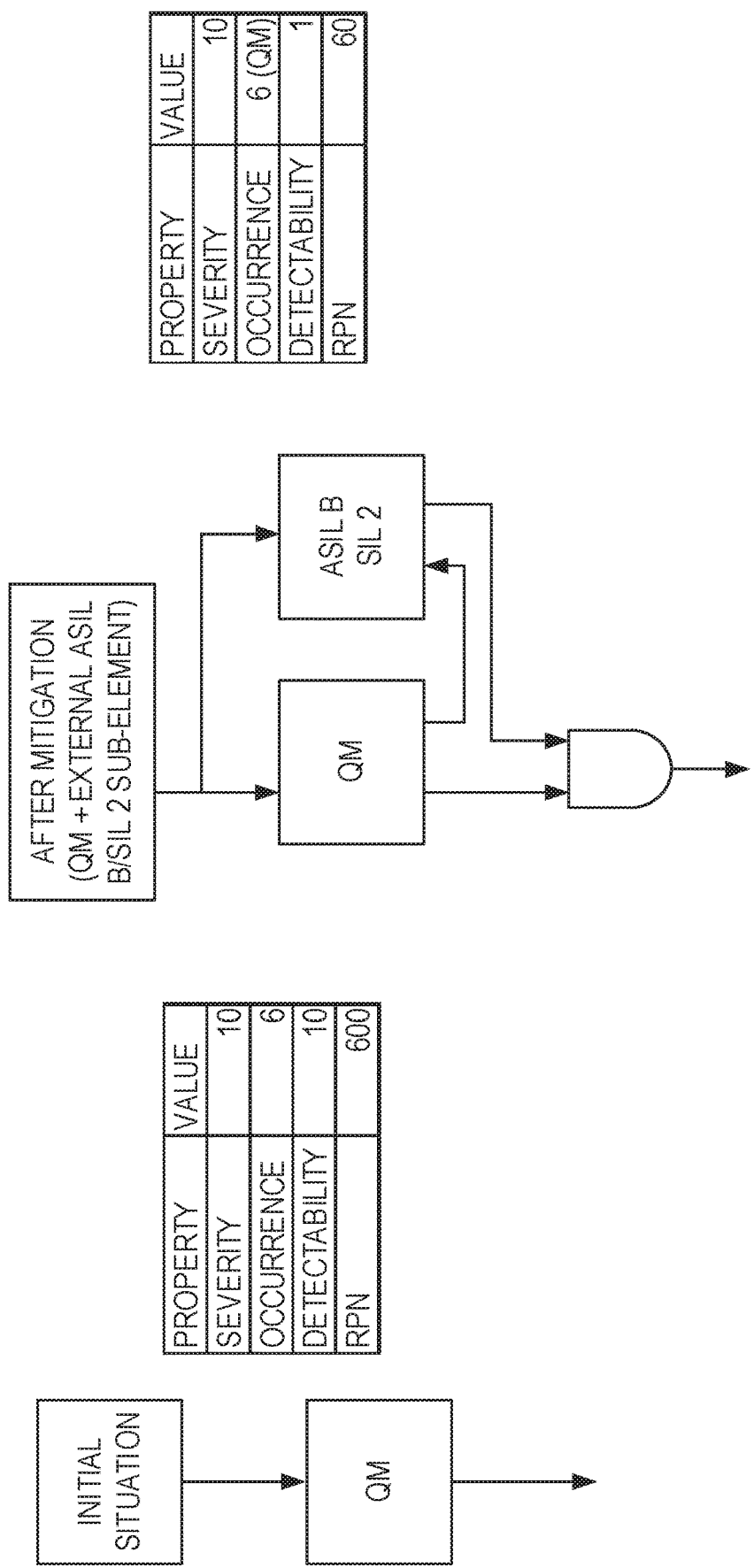

FIGS. 6-7 illustrate example initial and mitigated SW FMEA in accordance with some embodiments.

FIG. 6 shows the decrease in RPN available when a component or system is migrated from legacy code to a ASIL B/SIL 2 level. The legacy system has a severity of 10, an occurrence likelihood of 8, and a detectability of 10 (indicating a low likelihood of detection of a failure). After mitigation of failures in the legacy system to a ASIL B/SIL 2 level, the occurrence and detectability have dropped to 3 for occurrence, and 3, 2, or 1 for detectability (e.g., depending on specific implementation). The RPN has also been reduced from 800 to a range of 90 to 30, depending on implementation, after mitigation of failures in the legacy system.

FIG. 7 shows the decrease in RPN available when a component or system is migrated from a QM alone mitigation to QM and a ASIL B/SIL 2 level. The system in FIG. 7 includes an external ASIL B/SL 2 sub-element used to monitor only (e.g., receive data about a failure, but not necessarily lower occurrence of a failure). In this system, the detectability is improved from 10 to 1, significantly lowering the RPN.

These two examples shown in FIGS. 6-7 illustrate the value of using the RPN to determine SW FMEA, as well as how mitigation results in a lower RPN. The RPN may be used across components, subcomponents, or systems in a consistent way to allow for a quick, objective evaluation.

Figure 8:
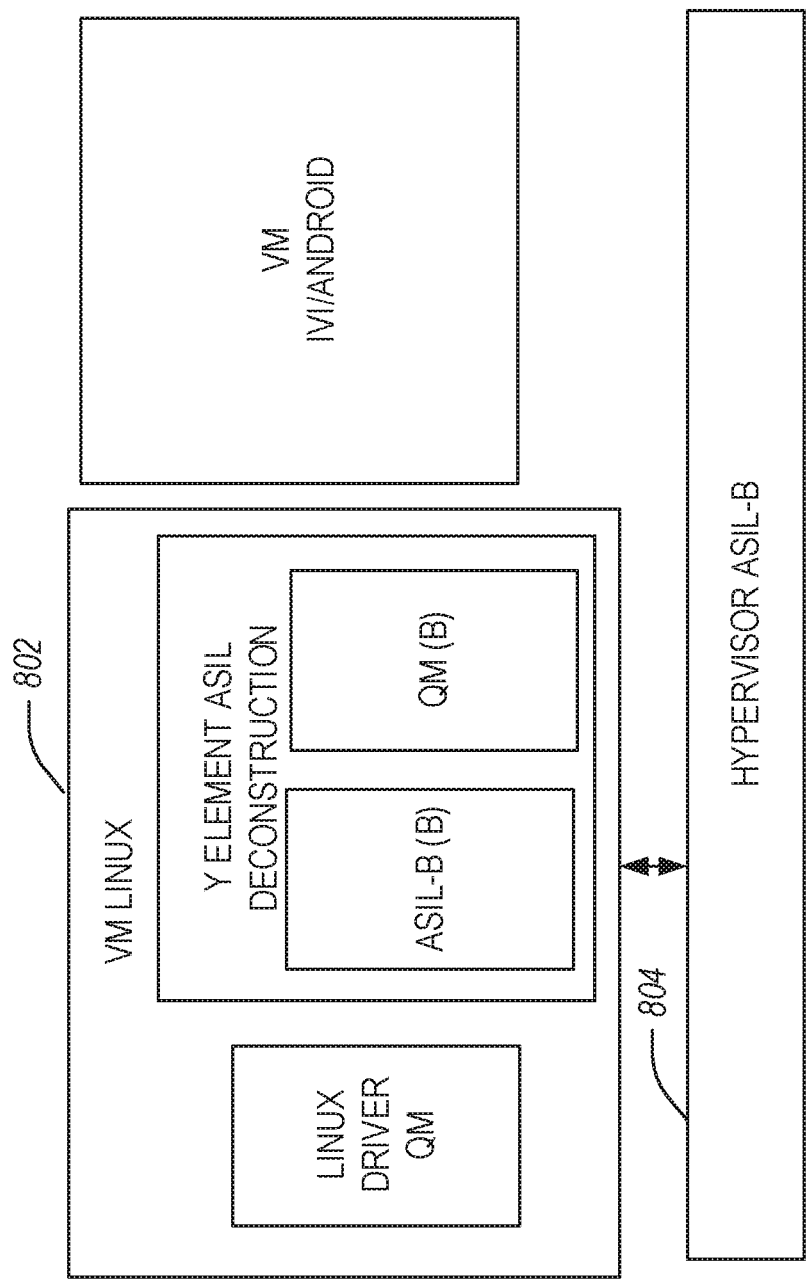
FIG. 8 illustrates an example software component for performing SW FMEA in accordance with some embodiments.

FIG. 8 illustrates an example software component 802 for performing SW FMEA in accordance with some embodiments. The component 802 may be, for example, a VM Linux component with a non-safety component (Linux Driver QM), an ASIL B portion and a QM portion, the latter two of which may be subcomponents of a component Y. The various components, subcomponents, and interactions may be evaluated using the objective SW FMEA to produce initial RPNs, and mitigations may be made accordingly. For example, component Y, subcomponents ASIL B or QM, interaction between component Y and Linux Driver QM, interaction between component 802 and a hypervisor 804, or interaction between the two subcomponents ASIL B and QM may be analyzed.

Figure 9:
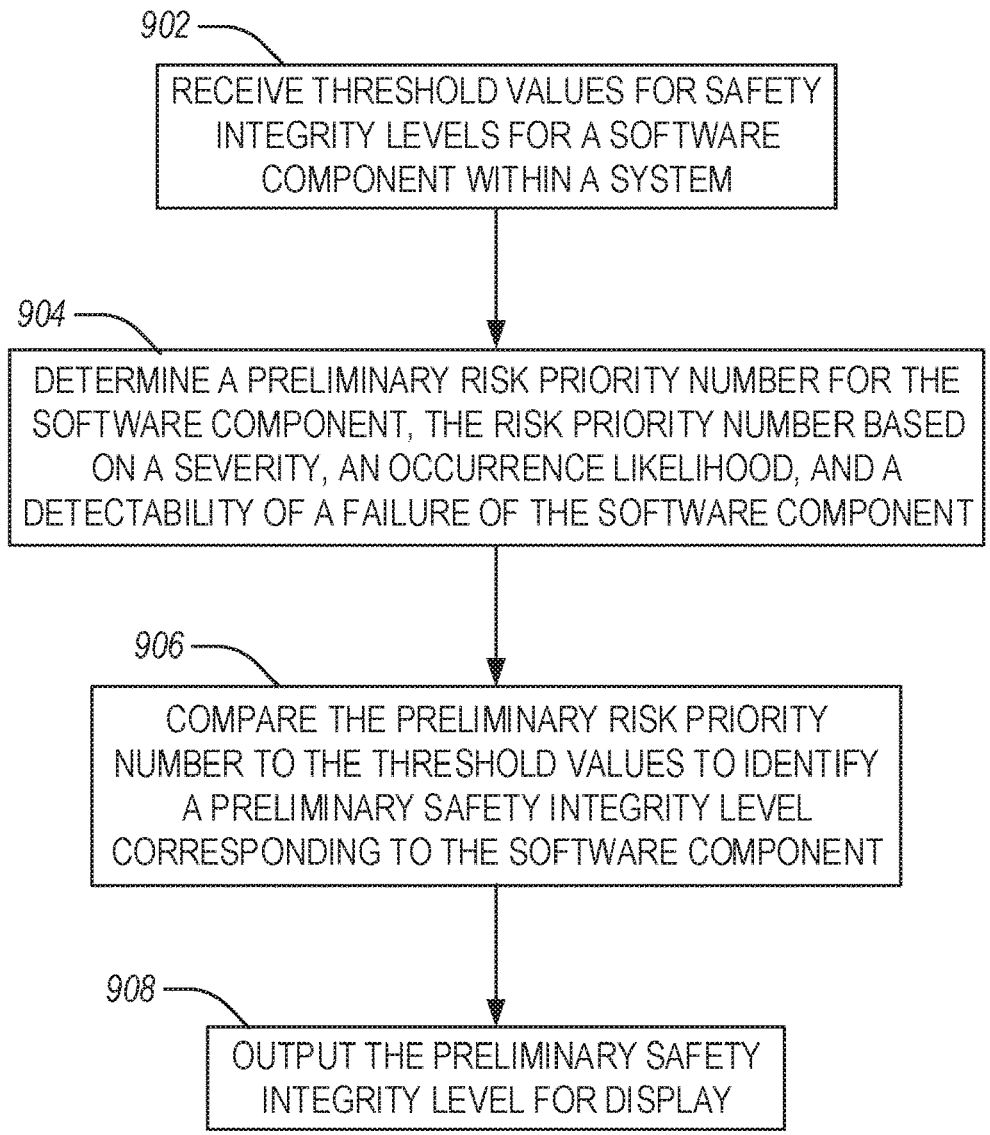
FIG. 9 illustrates a flowchart showing a technique for performing SW FMEA in accordance with some embodiments.

FIG. 9 illustrates a flowchart showing a technique 900 for performing SW FMEA in accordance with some embodiments. The technique 900 includes an operation 902 to receive threshold values for safety integrity levels for a software component within a system.

The technique 900 includes an operation 904 to determine a preliminary risk priority number for the software component, the risk priority number based on a severity, an occurrence likelihood, and a detectability of a failure of the software component. In an example, the preliminary risk priority number is a product of the severity, occurrence likelihood, and detectability values. For example, the severity and the occurrence likelihood may be integers between 1 and 10 inclusive, and the detectability may be an integer between 1 and 3 inclusive. In an example, operation 904 may include determining whether the software component is periodic, and wherein when the software component is not periodic, the preliminary risk priority number is lower than when the software component is periodic.

The technique 900 includes an operation 906 to compare the preliminary risk priority number to the threshold values to identify a preliminary safety integrity level corresponding to the software component. The preliminary safety integrity level may be a safety integrity level (SIL) according to an International Electrotechnical Commission (IEC) 61508 standard or an automotive safety integrity level (ASIL) according to an International Organization for Standardization (ISO) 26262 standard. The technique 900 includes an operation 908 to output the preliminary safety integrity level for display.

The technique 900 may include applying a mitigation to the system for the software component. After the mitigation is applied, an updated risk priority number may be determined, and an updated preliminary safety integrity level based on the updated risk priority number may be output. In this example, the occurrence likelihood or the detectability may change in response to the mitigation while the severity remains constant. Applying the mitigation may include suggesting a control measure, a detection measure, or a prevention measure including a corresponding effectiveness of implementing the respective measure.

The technique 900 may include determining the severity based on a failure mode type and function operability of the software component. In an example, the occurrence likelihood may be determined based on a predicted frequency of failure of the software component during operation. The detectability may be determined based on a likelihood of identifying an error and whether the error is likely to be identified before or after the error occurs.

Figure 10:
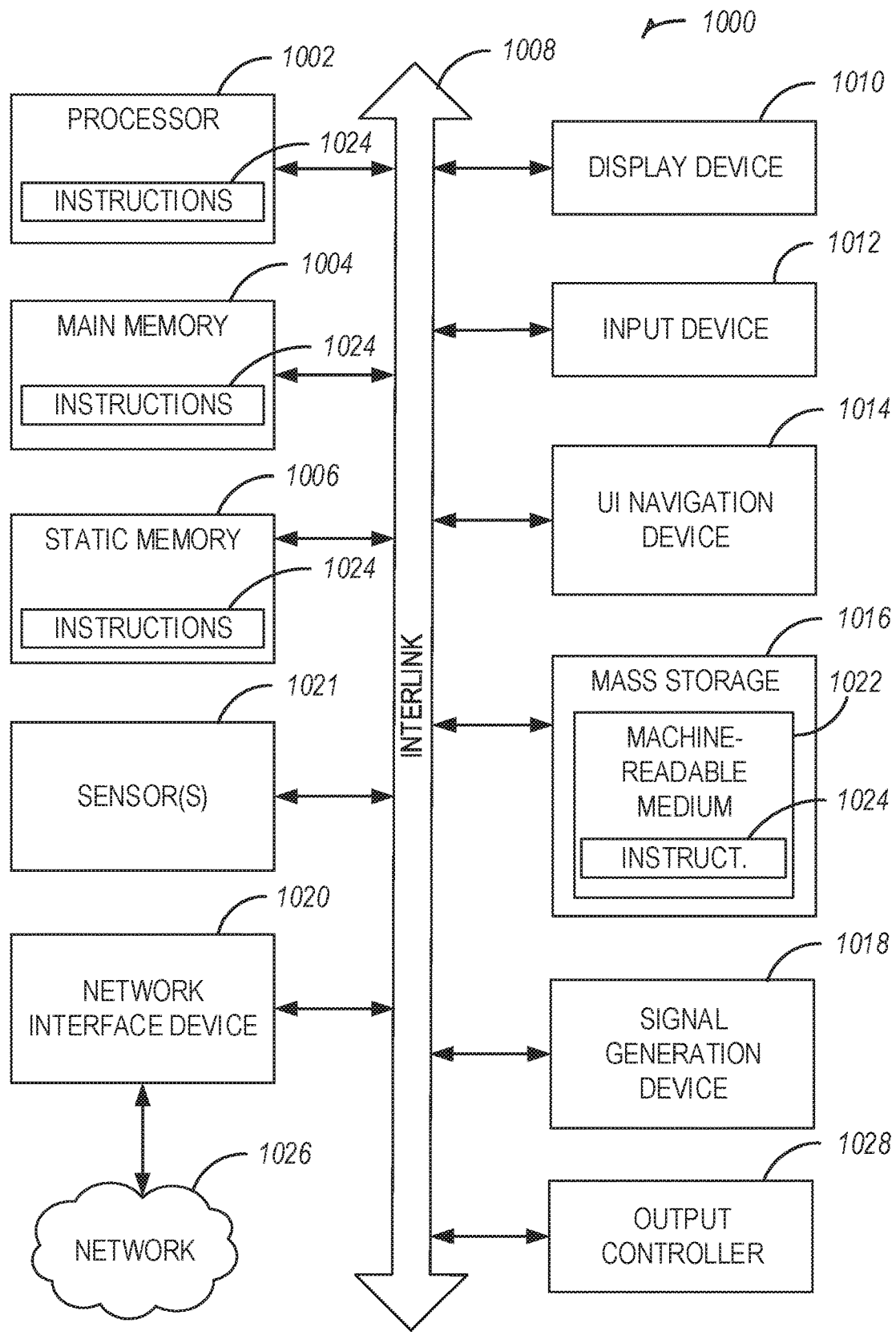
FIG. 10 illustrates generally an example of a block diagram of a machine upon which any one or more of the techniques discussed herein may perform in accordance with some embodiments.

FIG. 10 illustrates generally an example of a block diagram of a machine 1000 upon which any one or more of the techniques (e.g., methodologies) discussed herein may perform in accordance with some embodiments. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a drone computing device, a control system, an IMU, a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, alphanumeric input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 that is non-transitory on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

Each of these non-limiting examples may stand on its own, or may be combined in various permutations or combinations with one or more of the other examples.

Example 1 is a method for performing a software failure mode and effects analysis (SW FMEA) comprising: receiving, at a processor, threshold values for safety integrity levels for a software component within a system; determining, using the processor, a preliminary risk priority number for the software component, the risk priority number based on a severity, an occurrence likelihood, and a detectability of a failure of the software component; comparing the preliminary risk priority number to the threshold values to identify a preliminary safety integrity level corresponding to the software component; and outputting the preliminary safety integrity level for display.

In Example 2, the subject matter of Example 1 includes, applying a selected mitigation to the system for the software component; determining an updated risk priority number; and outputting an updated preliminary safety integrity level based on the updated risk priority number.

In Example 3, the subject matter of Example 2 includes, wherein the occurrence likelihood and the detectability change in response to the mitigation while the severity remains constant.

In Example 4, the subject matter of Examples 2-3 includes, wherein applying the mitigation includes suggesting a control measure, a detection measure, or a prevention measure including a corresponding effectiveness of implementing the respective measure.

In Example 5, the subject matter of Examples 1-4 includes, wherein the preliminary risk priority number is a mathematical product of the severity, the occurrence likelihood, and the detectability.

In Example 6, the subject matter of Example 5 includes, wherein the severity and the occurrence likelihood are integers between 1 and 10 inclusive, and the detectability is an integer between 1 and 3 inclusive.

In Example 7, the subject matter of Examples 1-6 includes, wherein determining the preliminary risk priority number includes determining whether the software component is periodic, and wherein when the software component is not periodic, the preliminary risk priority number is lower than when the software component is periodic.

In Example 8, the subject matter of Examples 1-7 includes, wherein the preliminary safety integrity level is a safety integrity level (SIL) according to an International Electrotechnical Commission (IEC) 61508 standard or an automotive safety integrity level (ASIL) according to an International Organization for Standardization (ISO) 26262 standard.

In Example 9, the subject matter of Examples 1-8 includes, determining the severity based on a failure mode type and function operability of the software component; determining the occurrence likelihood based on a predicted frequency of failure of the software component during operation; and determining the detectability based on a likelihood of identifying an error and whether the error is likely to be identified before or after the error occurs.

Example 10 is a control device for performing a software failure mode and effects analysis (SW FMEA) comprising: a processor; memory, including instructions, which when executed by the processor, cause the processor to; receive threshold values for safety integrity levels for a software component within a system; determine a preliminary risk priority number for the software component, the risk priority number based on a severity, an occurrence likelihood, and a detectability of a failure of the software component; compare the preliminary risk priority number to the threshold values to identify a preliminary safety integrity level corresponding to the software component; and output the preliminary safety integrity level; and a display device to present, on a user interface, the preliminary safety integrity level.

In Example 11, the subject matter of Example 10 includes, wherein the instructions further cause the processor to; apply a selected mitigation to the system for the software component; determine an updated risk priority number; and output an updated preliminary safety integrity level based on the updated risk priority number.

In Example 12, the subject matter of Example 11 includes, wherein the occurrence likelihood and the detectability change in response to the mitigation while the severity remains constant.

In Example 13, the subject matter of Examples 11-12 includes, wherein the instructions that cause the processor to apply the mitigation include instructions that cause the processor to suggest a control measure, a detection measure, or a prevention measure including a corresponding effectiveness of implementing the respective measure; and wherein the display is further configured to present the respective measure and the corresponding effectiveness.

In Example 14, the subject matter of Examples 10-13 includes, wherein the preliminary risk priority number is a mathematical product of the severity, the occurrence likelihood, and the detectability.

In Example 15, the subject matter of Example 14 includes, wherein the severity and the occurrence likelihood are integers between 1 and 10 inclusive, and the detectability is an integer between 1 and 3 inclusive.

In Example 16, the subject matter of Examples 10-15 includes, wherein the instructions that cause the processor to determine the preliminary risk priority number include instructions that cause the processor to determine whether the software component is periodic, and wherein when the software component is not periodic, the preliminary risk priority number is lower than when the software component is periodic.

In Example 17, the subject matter of Examples 10-16 includes, wherein the preliminary safety integrity level is a safety integrity level (SIL) according to an International Electrotechnical Commission (IEC) 61508 standard or an automotive safety integrity level (ASIL) according to an International Organization for Standardization (ISO) 26262 standard.

In Example 18, the subject matter of Examples 10-17 includes, wherein the instructions further cause the processor to; determine the severity based on a failure mode type and function operability of the software component; determine the occurrence likelihood based on a predicted frequency of failure of the software component during operation; and determine the detectability based on a likelihood of identifying an error and whether the error is likely to be identified before or after the error occurs.

Example 19 is at least one non-transitory machine-readable medium including instructions for performing a software failure mode and effects analysis (SW FMEA), which when executed by a machine, cause the machine to; receive threshold values for safety integrity levels for a software component within a system; determine a preliminary risk priority number for the software component, the risk priority number based on a severity, an occurrence likelihood, and a detectability of a failure of the software component; compare the preliminary risk priority number to the threshold values to identify a preliminary safety integrity level corresponding to the software component; and output the preliminary safety integrity level for display.

In Example 20, the subject matter of Example 19 includes, wherein the instructions further cause the machine to; apply a selected mitigation to the system for the software component; determine an updated risk priority number; and output an updated preliminary safety integrity level based on the updated risk priority number.

In Example 21, the subject matter of Example 20 includes, wherein the occurrence likelihood and the detectability change in response to the mitigation while the severity remains constant.

In Example 22, the subject matter of Examples 20-21 includes, wherein the instructions that cause the machine to apply the mitigation include instructions that cause the machine to suggest a control measure, a detection measure, or a prevention measure including a corresponding effectiveness of implementing the respective measure; and wherein the display is further configured to present the respective measure and the corresponding effectiveness.

In Example 23, the subject matter of Examples 19-22 includes, wherein the preliminary risk priority number is a mathematical product of the severity, the occurrence likelihood, and the detectability.

In Example 24, the subject matter of Example 23 includes, wherein the severity and the occurrence likelihood are integers between 1 and 10 inclusive, and the detectability is an integer between 1 and 3 inclusive.

In Example 25, the subject matter of Examples 19-24 includes, wherein the instructions that cause the machine to determine the preliminary risk priority number include instructions that cause the machine to determine whether the software component is periodic, and wherein when the software component is not periodic, the preliminary risk priority number is lower than when the software component is periodic.

In Example 26, the subject matter of Examples 19-25 includes, wherein the preliminary safety integrity level is a safety integrity level (SIL) according to an International Electrotechnical Commission (IEC) 61508 standard or an automotive safety integrity level (ASIL) according to an International Organization for Standardization (ISO) 26262 standard.

In Example 27, the subject matter of Examples 19-26 includes, wherein the instructions further cause the machine to; determine the severity based on a failure mode type and function operability of the software component; determine the occurrence likelihood based on a predicted frequency of failure of the software component during operation; and determine the detectability based on a likelihood of identifying an error and whether the error is likely to be identified before or after the error occurs.

Example 28 is at least one machine-readable medium including instructions that, when executed by processing circuitry, cause the processing circuitry to perform operations to implement of any of Examples 1-27.

Example 29 is an apparatus comprising means to implement of any of Examples 1-27.

Example 30 is a system to implement of any of Examples 1-27.

Example 31 is a method to implement of any of Examples 1-27.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A control device for performing a software failure mode and effects analysis (SW FMEA) comprising:
   a processor;
   memory, including instructions, which when executed by the processor, cause the processor to:
   receive threshold values for safety integrity levels for a software component within a system;
   monitor the software component, wherein to monitor the software component includes to monitor an interaction between the software component and at least one of: a second component or a subcomponent;
   determine, based at least in part on a result of the monitoring of the software component, a preliminary risk priority number for the software component, the risk priority number based on a ranking of a possibility of failure of the software component, the ranking determined by a severity, an occurrence likelihood, and a detectability of a failure of the software component;
   compare the preliminary risk priority number to the threshold values to identify a preliminary safety integrity level corresponding to the software component; and
   output the preliminary safety integrity level;
   apply a mitigation to the system for the software component, wherein the mitigation is at least one of: improving a code in at least one of: the software component, the second component, or the subcomponent, swapping at least a portion of at least one of: the software component, the second component or the subcomponent, rewriting at least a portion of: the software component, the second component or the subcomponent, or changing an interaction between the software component and at least one of the second component or the subcomponent; and
   a display device to present, on a user interface, the preliminary safety integrity level.

2. The control device of claim 1, wherein the instructions further cause the processor to:
   determine an updated risk priority number; and
   output an updated preliminary safety integrity level based on the updated risk priority number.

3. The control device of claim 2, wherein the occurrence likelihood and the detectability change in response to the mitigation while the severity remains constant.

4. The control device of claim 2, wherein the instructions that cause the processor to apply the mitigation include instructions that cause the processor to suggest a control measure, a detection measure, or a prevention measure including a corresponding effectiveness of implementing the respective measure; and wherein the display is further configured to present the respective measure and the corresponding effectiveness.

5. The control device of claim 1, wherein the preliminary risk priority number is a mathematical product of the severity, the occurrence likelihood, and the detectability.

6. The control device of claim 5, wherein the severity and the occurrence likelihood are integers between 1 and 10 inclusive, and the detectability is an integer between 1 and 3 inclusive.

7. The control device of claim 1, wherein the instructions that cause the processor to determine the preliminary risk priority number include instructions that cause the processor to determine whether the software component is periodic, and wherein when the software component is not periodic, the preliminary risk priority number is lower than when the software component is periodic.

8. The control device of claim 1, wherein the preliminary safety integrity level is a safety integrity level (SIL) according to an International Electrotechnical Commission (IEC) 61508 standard or an automotive safety integrity level (ASIL) according to an International Organization for Standardization (ISO) 26262 standard.

9. The control device of claim 1, wherein the instructions further cause the processor to:
   determine the severity based on a failure mode type and function operability of the software component;
   determine the occurrence likelihood based on a predicted frequency of failure of the software component during operation; and
   determine the detectability based on a likelihood of identifying an error and whether the error is likely to be identified before or after the error occurs.

10. At least one non-transitory machine-readable medium including instructions for performing a software failure mode and effects analysis (SW FMEA), which when executed by a machine, cause the machine to:
    receive threshold values for safety integrity levels for a software component within a system;
    monitor the software component, wherein to monitor the software component includes to monitor an interaction between the software component and at least one of: a second component or a subcomponent;
    determine, based at least in part on a result of the monitoring of the software component, a preliminary risk priority number for the software component, the risk priority number based on a ranking of a possibility of failure of the software component, the ranking determined by a severity, an occurrence likelihood, and a detectability of a failure of the software component;
    compare the preliminary risk priority number to the threshold values to identify a preliminary safety integrity level corresponding to the software component;
    apply a mitigation to the system for the software component, wherein the mitigation is at least one of: improving a code in at least one of: the software component, the second component, or the subcomponent, swapping at least a portion of at least one of: the software component, the second component or the subcomponent, rewriting at least a portion of: the software component, the second component or the subcomponent, or changing an interaction between the software component and at least one of the second component or the subcomponent; and
    output the preliminary safety integrity level for display.

11. The at least one machine-readable medium of claim 10, wherein the instructions further cause the machine to:
    determine an updated risk priority number, based on the applied mitigation; and output an updated preliminary safety integrity level based on the updated risk priority number.

12. The at least one machine-readable medium of claim 11, wherein the occurrence likelihood and the detectability change in response to the mitigation while the severity remains constant.

13. The at least one machine-readable medium of claim 11, wherein the instructions that cause the machine to apply the mitigation include instructions that cause the machine to suggest a control measure, a detection measure, or a prevention measure including a corresponding effectiveness of implementing the respective measure; and wherein the display is further configured to present the respective measure and the corresponding effectiveness.

14. The at least one machine-readable medium of claim 10, wherein the preliminary risk priority number is a mathematical product of the severity, the occurrence likelihood, and the detectability.

15. The at least one machine-readable medium of claim 14, wherein the severity and the occurrence likelihood are integers between 1 and 10 inclusive, and the detectability is an integer between 1 and 3 inclusive.

16. The at least one machine-readable medium of claim 10, wherein the instructions that cause the machine to determine the preliminary risk priority number include instructions that cause the machine to determine whether the software component is periodic, and wherein when the software component is not periodic, the preliminary risk priority number is lower than when the software component is periodic.

17. The at least one machine-readable medium of claim 10, wherein the preliminary safety integrity level is a safety integrity level (SIL) according to an International Electrotechnical Commission (IEC) 61508 standard or an automotive safety integrity level (ASIL) according to an International Organization for Standardization (ISO) 26262 standard.

18. The at least one machine-readable medium of claim 10, wherein the instructions further cause the machine to:
  determine the severity based on a failure mode type and function operability of the software component;
  determine the occurrence likelihood based on a predicted frequency of failure of the software component during operation; and
  determine the detectability based on a likelihood of identifying an error and whether the error is likely to be identified before or after the error occurs.

19. A method for performing a software failure mode and effects analysis (SW FMEA) comprising:
  receiving, at a processor, threshold values for safety integrity levels for a software component within a system;
  monitoring the software component, wherein monitoring the software component includes to monitor an interaction between the software component and at least one of: a second component or a subcomponent;
  determining, based at least in part on a result of the monitoring of the software component, using the processor, a preliminary risk priority number for the software component, the risk priority number based on a ranking of a possibility of a failure of the software component, the ranking determined by a severity, an occurrence likelihood, and a detectability of a failure of the software component;
  comparing the preliminary risk priority number to the threshold values to identify a preliminary safety integrity level corresponding to the software component;
  applying a mitigation to the system for the software component, wherein the mitigation is at least one of: improving a code in at least one of: the software component, the second component, or the subcomponent, swapping at least a portion of at least one of: the software component, the second component or the subcomponent, rewriting at least a portion of: the software component, the second component or the subcomponent, or changing an interaction between the software component and at least one of the second component or the subcomponent; and
  outputting the preliminary safety integrity level for display.

20. The method of claim 19, further comprising:
  determining an updated risk priority number, based on the applied mitigation; and
  outputting an updated preliminary safety integrity level based on the updated risk priority number.

21. The method of claim 20, wherein the occurrence likelihood and the detectability change in response to the mitigation while the severity remains constant.

22. The method of claim 19, wherein determining the preliminary risk priority number includes determining whether the software component is periodic, and wherein when the software component is not periodic, the preliminary risk priority number is lower than when the software component is periodic.

23. The method of claim 19, wherein the preliminary safety integrity level is a safety integrity level (SIL) according to an International Electrotechnical Commission (IEC) 61508 standard or an automotive safety integrity level (ASIL) according to an International Organization for Standardization (ISO) 26262 standard.

24. The method of claim 19, further comprising:
  determining the severity based on a failure mode type and function operability of the software component;
  determining the occurrence likelihood based on a predicted frequency of failure of the software component during operation; and
  determining the detectability based on a likelihood of identifying an error and whether the error is likely to be identified before or after the error occurs.

* * * * *